US009032215B2

(12) United States Patent
Kalofonos et al.

(10) Patent No.: US 9,032,215 B2
(45) Date of Patent: May 12, 2015

(54) MANAGEMENT OF ACCESS CONTROL IN WIRELESS NETWORKS

(75) Inventors: Dimitris Kalofonos, Cambridge, MA (US); Saad Shakhshir, Brighton, MA (US)

(73) Assignee: Nokia Corporation, Espoo (FI)

( * ) Notice: Subject to any disclaimer, the term of this patent is extended or adjusted under 35 U.S.C. 154(b) by 2478 days.

(21) Appl. No.: 11/153,307

(22) Filed: Jun. 15, 2005

(65) Prior Publication Data
US 2006/0288227 A1 Dec. 21, 2006

(51) Int. Cl.
G06F 21/00 (2013.01)
H04L 29/06 (2006.01)
H04L 12/28 (2006.01)
H04W 12/08 (2009.01)

(52) U.S. Cl.
CPC ........ *H04L 63/0428* (2013.01); *H04L 12/2803* (2013.01); *H04L 12/282* (2013.01); *H04L 63/101* (2013.01); *H04L 63/102* (2013.01); *H04L 2012/285* (2013.01); *H04W 12/08* (2013.01)

(58) Field of Classification Search
CPC . H04L 63/102; H04L 63/0428; H04L 63/101; H04W 12/08
USPC .......................... 726/9, 13; 713/182; 709/228
See application file for complete search history.

(56) References Cited

U.S. PATENT DOCUMENTS

| | | | | |
|---|---|---|---|---|
| 5,848,233 | A * | 12/1998 | Radia et al. .................... | 726/13 |
| 6,115,040 | A * | 9/2000 | Bladow et al. ................ | 715/741 |
| 6,226,752 | B1 * | 5/2001 | Gupta et al. ..................... | 726/9 |
| 6,601,171 | B1 | 7/2003 | Carter et al. | |
| 6,732,270 | B1 * | 5/2004 | Patzer et al. .................. | 713/170 |
| 7,525,926 | B2 * | 4/2009 | Cho et al. ...................... | 370/252 |

(Continued)

FOREIGN PATENT DOCUMENTS

EP 1255392 A2 11/2002
RU 2169437 6/2001

(Continued)

OTHER PUBLICATIONS

Asokan, N., et al. "Visitor access management in personal wireless networks." Multimedia, Seventh IEEE International Symposium on. IEEE, 2005.*
Efstathiou, Elias C., et al.. "A peer-to-peer approach to wireless LAN roaming." Proceedings of the 1st ACM international workshop on Wireless mobile applications and services on WLAN hotspots. (pp. 10-18). ACM, 2003.*

(Continued)

*Primary Examiner* — Luu Pham
*Assistant Examiner* — Kari Schmidt
(74) *Attorney, Agent, or Firm* — Banner & Witcoff, Ltd.

(57) ABSTRACT

Management of access control in wireless networks known as smart spaces includes a framework that presents non-expert users with a consistent and intuitive interaction mechanism to manage access to devices they own in the smart space without exposing to them the complexity of the underlying security infrastructure. Access control of devices in a network can include providing an interface between a user-level tool on a first device connected to a network and security components associated with the network, communicating a passlet between the user-level tool and the interface, verifying access permission at a second device on the network where access permissions are based on the passlet, and providing a response to the first device based on the verification of the access permission in the passlet. The passlet provides access permissions based on a particular user rather than a particular device.

28 Claims, 11 Drawing Sheets

(56) References Cited

U.S. PATENT DOCUMENTS

| | | |
|---|---|---|
| 2002/0049806 A1* | 4/2002 | Gatz et al. ............... 709/203 |
| 2002/0112186 A1 | 8/2002 | Ford et al. |
| 2002/0129024 A1* | 9/2002 | Lee .......................... 707/10 |
| 2002/0129261 A1* | 9/2002 | Cromer et al. .............. 713/193 |
| 2004/0059913 A1* | 3/2004 | de Jong ..................... 713/165 |
| 2004/0158712 A1 | 8/2004 | Lee et al. |
| 2004/0162880 A1* | 8/2004 | Arnone et al. .............. 709/206 |
| 2005/0044411 A1* | 2/2005 | Somin et al. ............... 713/201 |
| 2005/0066037 A1* | 3/2005 | Song et al. ................. 709/227 |
| 2005/0114520 A1* | 5/2005 | White et al. ............... 709/228 |
| 2005/0120125 A1* | 6/2005 | Morten et al. .............. 709/231 |

FOREIGN PATENT DOCUMENTS

| | | | |
|---|---|---|---|
| WO | WO 2004/093381 | 10/2004 | |
| WO | WO 2005/116841 | * 12/2005 | .......... G06F 12/14 |

OTHER PUBLICATIONS

Lai, David, et al. "Secure service sharing over networks for mobile users using service network graphs." Wireless Telecommunications Symposium, 2006. WTS'06. IEEE, 2006.*

International Search report for PCT Application PCT/IB2006/001595.

Office Action for RU200714785109 dated Apr. 17, 2009.

Office Action for RU 2007147857/09 dated Nov. 18, 2009 with English Translation.

Shakhshir, Saad Z, et al., "IntuiSec: A Framework for Intuitive User Interaction with Smart Home Security," Nokia Research Center, No. NRC-TR-2006-003, Apr. 10, 2006, pp. 17-26.

Extended European Search Report dated Oct. 14, 2014 in Application No. 06765525.8.

* cited by examiner

FIG. 3 SENDER PHONE VIEW

MANAGEMENT OF ACCESS CONTROL IN WIRELESS NETWORKS

CROSS REFERENCE TO RELATED APPLICATIONS

None.

BACKGROUND OF THE INVENTION

1. Field of the Invention

The present invention relates generally to computer security. More specifically, the present invention relates to computer security in distributed systems and user interaction with such systems.

2. Description of the Related Art

This section is intended to provide a background or context. The description herein may include concepts that could be pursued, but are not necessarily ones that have been previously conceived or pursued. Therefore, unless otherwise indicated herein, what is described in this section is not prior art to the claims in this application and is not admitted to be prior art by inclusion in this section.

Most current research in security addresses security theory and engineering (e.g. cryptography, algorithms, protocols) which aim at offering high guarantees for security. However, typically, in actual use, people are the weakest link in security. Even experienced computer users often find security intimidating or obstructing, applying it partially or not at all.

One application of security is with networked systems, such as home networks of computers, televisions, phones and other devices. The Digital Living Network Alliance (DLNA) has specified products for such networked "smart homes." Digital Living Network Alliance (DLNA), "Home Networked Device Interoperability Guidelines v1.0", June 2004. The users of these products are non-experts, everyday consumers, which only exacerbates the problem of interacting with security. Thus, there is a need for easy-to-use security mechanisms and real-world intuitive security abstractions.

A wide variety of security mechanisms and protocols at different levels need to be implemented to provide security in a "smart space" of networked devices, such as link-level security (e.g. Bluetooth Special Interest Group: "Specification Vol. 1, Specification of the Bluetooth System, Core", version 1.1, Feb. 22 2001; Bluetooth SIG, "Bluetooth Security Architecture", White Paper, version 1.0, 15 Jul. 1999; IEEE 802.1X, "802.1x-2001—Port Based Network Access Control", June 2001; IEEE 802.11i, "802.11 Amendment 6: Medium Access Control Security Enhancements", July 2004), IP-level security (e.g. IETF Network Working Group, "RFC2401: Security Architecture for the Internet Protocol", November 1998), transport-level security (e.g. IETF Network Working Group, "RFC2246: The TLS Protocol, v1.0", January 1999; IETF Network Working Group, "RFC2818: HTTP over TLS", May 2000) or application-level security (e.g. UPnP Forum, "UPnP Security Ceremonies Design Document v1.0", Oct. 3, 2003). Each of these security mechanisms requires different forms of user interaction in order for the user to configure the system's security properties to match the user's intent.

Examples of conventional concepts for management access of networked devices include link-keys, PINs, passwords, Access Control Lists (ACL), filtering of hardware addresses, creation of administrator and guest accounts and their options, certificates, certification authorities, concepts related to private/public key pairs, authentication and authorization options, etc. Depending on which security mechanisms and options are implemented in the underlying security infrastructure, the user has to take a number of different actions and perform different tasks, in essence in order to achieve the same user-level goal. Consumer non-experts generally do not use security because of the high level of complexity in most security systems.

Thus, there is a need for a middleware layer of indirection, which abstracts security concepts and exposes to users only intuitive security abstractions that can be easily understood, regardless of the protocols and algorithms used in the underlying security infrastructure. Further, there is a need for easier management of access control in networked spaces. Yet further, there is a need to improve the user experience in controlling access of devices in a network of devices.

SUMMARY OF THE INVENTION

In general, the present invention provides a solution to the problem of creating consistent and intuitive user interaction to manage access control in smart-spaces, regardless of the specific underlying security mechanisms. According to the exemplary embodiments described herein, owners of network-connected devices can use user-level tools to create entities called "passlets" and hand the passlets to other users, who can then gain connectivity-level and device-level access to functionality prescribed by these passlets. Passlets are user-perceived entities, which act as "passes" or "tickets" that grant a user-perceived, high-level permission to their bearer. Devices generating these passlets (called Passlet Generating Devices-PGD) use the user-level tools to capture the user's intent in a consistent and intuitive manner. PGDs also include necessary information (usually invisible to the user) in passlets that allow middleware components to translate the high-level user intent to specific settings and parameters depending on the underlying security framework implemented in the networked area or "smart space."

One exemplary embodiment relates to a method for access control of devices in a network. The method includes providing an interface between a user-level tool on a first device connected to a network and security components associated with the network, communicating between the user-level tool and the interface, verifying access permission at a second device on the network where access permissions are based on data from the user-level tool, and providing a response to the first device based on the verification of the access permission.

Another exemplary embodiment relates to a device having programmed instructions for controlling access to devices on a network. The device includes passlet middleware including a database of passlets. Passlets include access permissions specific to a particular user for gaining access to one or more networked devices. The device further includes programmed instructions providing a user interface to select passlets from the database of passlets. The device still further includes a communication interface configured to communicate the selected passlet to a networked device to request access thereto.

Another exemplary embodiment relates to a system for managed access control of devices in a network. The system includes a first device connected to a network and a second device connected to the network. The first device includes a database of passlets defining access permissions to devices in the network. The first device also includes a user-level tool and an interface between the user-level tool and security components. The user-level tool enables the selection of a passlet from the database of passlets and communication of the selected passlet to the interface. The second device verifies access permission based on the selected passlet communicated from the interface to the second device. The second device provides a response to the first device based on the verification of access permission in the passlet.

Another exemplary embodiment relates to a computer program product enabling access control of devices in a network. The computer program product includes computer code to provide an interface between a user-level tool on a first device connected to a network and security components associated with the network, to communicate between the user-level tool and the interface, to verify access permission at a second device on the network, and to provide a response to the first device based on the verification of the access permission.

DETAILED DESCRIPTION OF EXEMPLARY EMBODIMENTS

Figure 1:
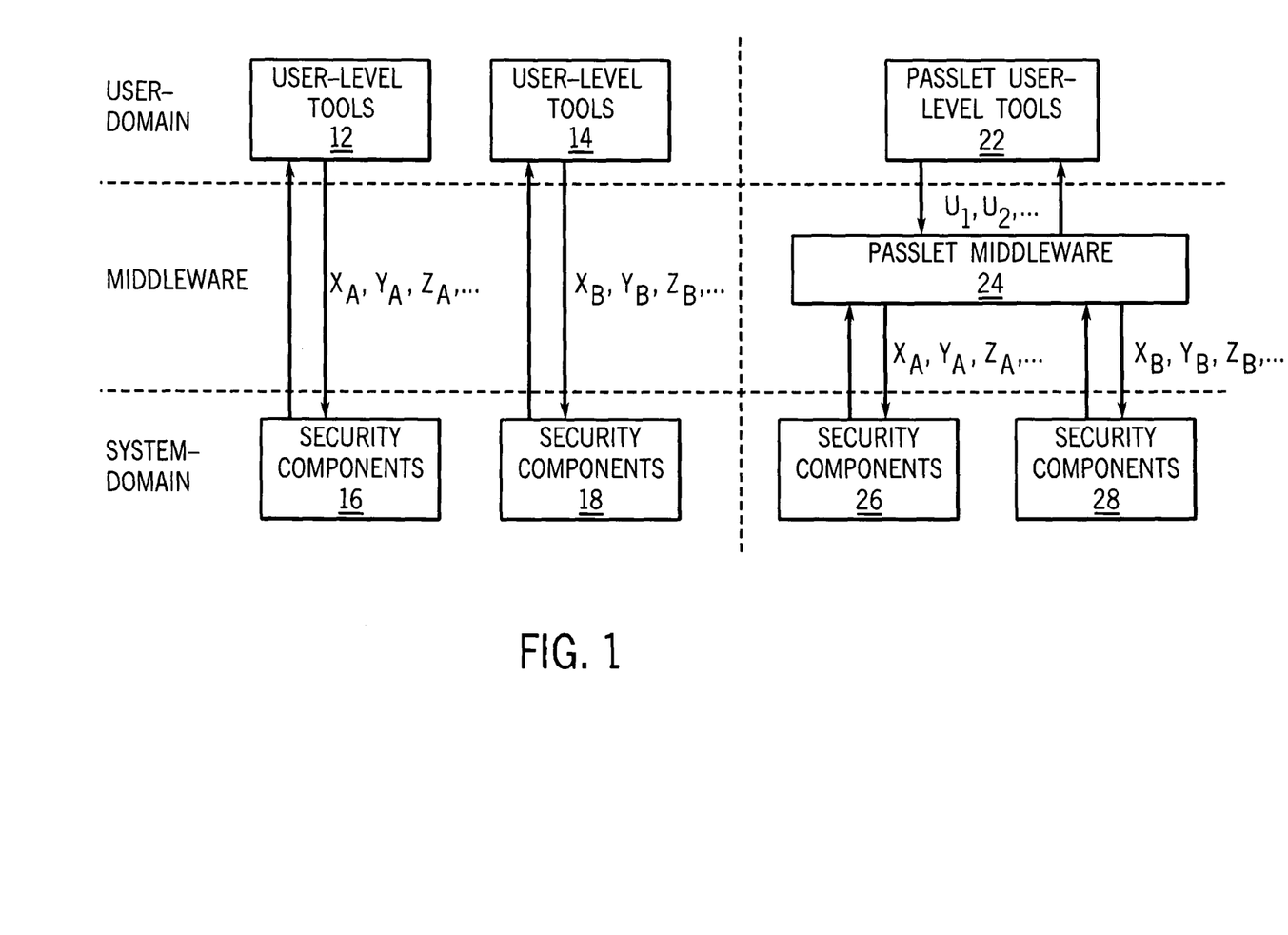
FIG. 1 is a depiction of indirection introduced by a passlet mechanism to expose a consistent and intuitive user interaction with security for access control, regardless of the underlying security framework, in accordance with an exemplary embodiment.

FIG. 1 illustrates a comparison of conventional user interaction to gain access control with granting access control using a passlet mechanism. The passlet mechanism provides an intuitive user interaction for access control, regardless of the underlying security framework. As such, non-expert users can manage access to devices in a smart-space, such as a DLNA-type smart home, without being exposed to the complexity of the underlying security infrastructure.

In a typical user interaction, the user domain includes user-level tools, such as tools 12 and tools 14, having security frameworks. Tools 12 can include security concepts $X_A, Y_A, Z_A$, such as 802.11 WEP keys, 802.11 AP SSID, MAC address ACL on the 802.11 AP, account user-name and password on a Media Server, and read rights on a directory. Tools 14 can include security concepts $X_B, Y_B, Z_B$, such as Bluetooth (BTH) Passkeys to pair with a BTH AP, PPP user account on the BTH AP, account user-name and password on a trusted $3^{rd}$ party authentication server, ticket from the trusted $3^{rd}$ party authentication server with session keys to the Media Server, and read rights on a directory.

Tools 12 and tools 14 are used for user interaction to grant access control. These tools directly interface with system domain security components 16 and 18. Security components 16 and 18 can include platform, protocols, crypto algorithms, and other security components. In the situation where user-level tools 12 and/or user-level tools 14 interact directly with the security infrastructure, such as security components 16 and/or 18, this interaction is at the link level and the application level. As such, the interaction may vary depending on the security framework.

The introduction of a middleware between user tools and security infrastructure enables the translation of interactions between user tools and the security infrastructure. As such, interactions can be made to be consistent regardless of the type of security framework. The middleware can include any of a variety of abstractions to interface the user domain and system domain. A passlet is one example of a general abstraction to carry out this interface. According to an exemplary embodiment, passlet user-level tools 22 are employed to interface with passlet middleware 24, which interfaces with security components 26 and 28. Passlet user-level tools 22 can include concepts $U_1, U_2$, such as "passlets" that allow access to a movie in a public directory of a media server, for one day, regardless of the specifics of the underlying security framework. The passlet user-level tools 22 reside on devices that act as points of interaction with users, capturing the user's intent. The passlet middleware 24 translates the user's intent to specific settings and configurations of the underlying security infrastructure. Security components 26 and 28 can include platform, protocols, crypto algorithms, and other security components. By way of example, the passlet user-level tools 22 can be used on a mobile device to allow a visitor to a location to use a video server at the location to watch a specific movie in a public directory.

The passlet middleware 24 translates user intuitive concepts expressing the user's intent to specific settings and configuration of the underlying security infrastructure. For example, the passlet middleware 24 may translate the user intent in the above example into link-keys transmitted to the visitor device to enable it to attach to an access point (AP), add the visitor device's MAC address to the MAC access control list (ACL) of the AP, create a temporary account (e.g. user_name/password) for the visitor at the Video Server and transmit the user_name/password to the visitor device, add under that temporary account the list of movies allowed for this visitor to access, etc. All these interactions happen transparently to the user by the passlet middleware 24 which resides in all connected devices belonging to a smart space network. As such, the passlet user-level tools 22 and passlet middleware 24 provide for a consistent and intuitive user interaction mechanism with security components 26 and 28, without exposing any of the specifics of the underlying security mechanisms.

According to various exemplary embodiments, general passlet properties can include the following. Passlets grant access to users or groups of users and not devices. The issuer of a passlet is one of the owners of the target device. A passlet may grant access to more than one devices or to groups of devices owned by the issuer. After receiving a passlet in his/her device, a user can move the passlet to another device and use it to get access prescribed by it. Valid passlets automatically give connectivity access to the home network for their users. A malicious user that gets a copy of a passlet for a device cannot use it to access the device. Passlets are different for each device type they provide access to. Users customize device-type-specific template passlets to allow temporary access to specific functionality. For example, a "one-day media-server passlet" may allow visitor John to play a movie from the media-server's /public/directory on his device, but not to record, for one day. Similarly, a "one-year printer passlet" may allow a new roommate Mary to print, but not to configure my printer, for one year. Passlets can be revoked at any time by the issuer.

The framework created by the use of the passlet user-level tools 22 and passlet middleware 24 deals with access control at two levels, without exposing the distinction to users. The two levels are a connectivity level and a device (or service) level. With respect to the connectivity level, in order for any device to be able to discover or interact with any of the networked devices forming a smart-space, that device has to first gain link/network-level access to the network that these devices are connected to. Access control at this level ensures that only properly authenticated and authorized devices gain connectivity access to the smart-space network. With respect to the device-level (or service-level), all connected devices in a smart-space expose some functionality which can be used remotely by other devices connected to the same smart-space network. Access control at this level ensures that only properly authenticated and authorized devices can gain connectivity to all or a subset of the functionality exposed by each of the connected devices in the smart-space.

Figure 2:
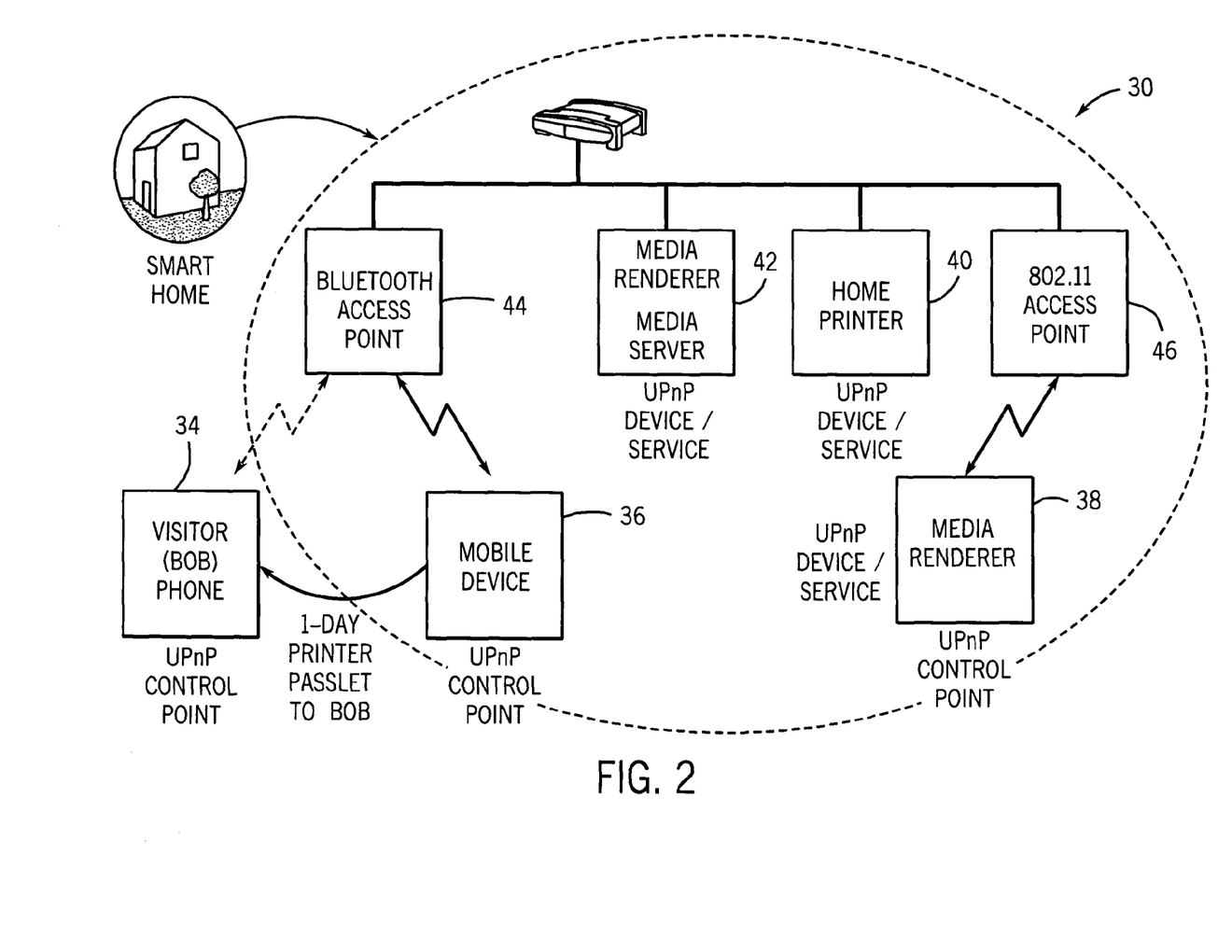
FIG. 2 is an illustration of an example smart home using universal plug and play (UPNP) devices in accordance with an exemplary embodiment.

FIG. 2 illustrates an exemplary smart-space system 30 utilizing passlets described with respect to FIG. 1. The smart-space system 30 includes networked devices that use Universal Plug and Play (UPNP) distributed computing architecture. However, any other distributed computing architecture could be used. The networked devices in the smart-space system 30 are connected with wired and wireless (e.g. Bluetooth, 802.11) link-level technologies forming an Ethernet LAN, which represents the smart-space network.

The UPnP-based networked devices are distinguished in UPnP Control Points (CP) which are used to access networked services and UPnP Devices/Services which are the entities exposing these networked services. In the smart-space system 30, control points include mobile devices 34 and 36 and the UPnP Devices/Services are implemented using devices 38, 40, and 42. For example, device 40 is a printer. Access points are also included using devices 44 and 46. Device 44 provides a Bluetooth access point and laptop computer 46 provides a 802.11 access point. In the smart-space system 30, an out-of-bound mechanism is used to allow secure 2-way information exchange through "touch" or a communication "ping" between devices. Examples of technologies enabling such "touch" or TAPing include Infrared, Near-Field Communications (NFC) and RFID.

Figure 3:
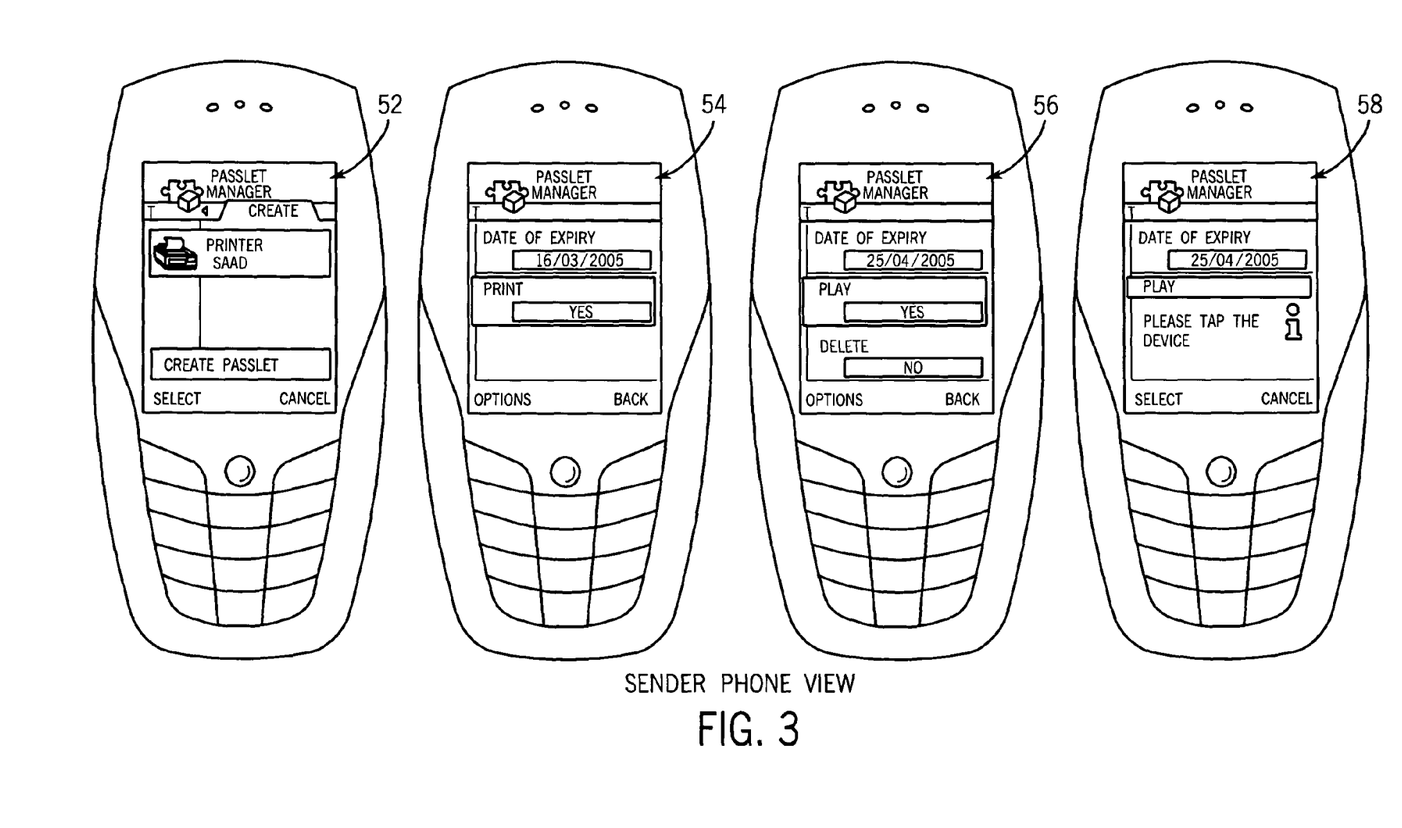
FIG. 3 is an illustration of an example implementation of a user-level tool to create passlets using a mobile device in accordance with an exemplary embodiment.
Figure 4:
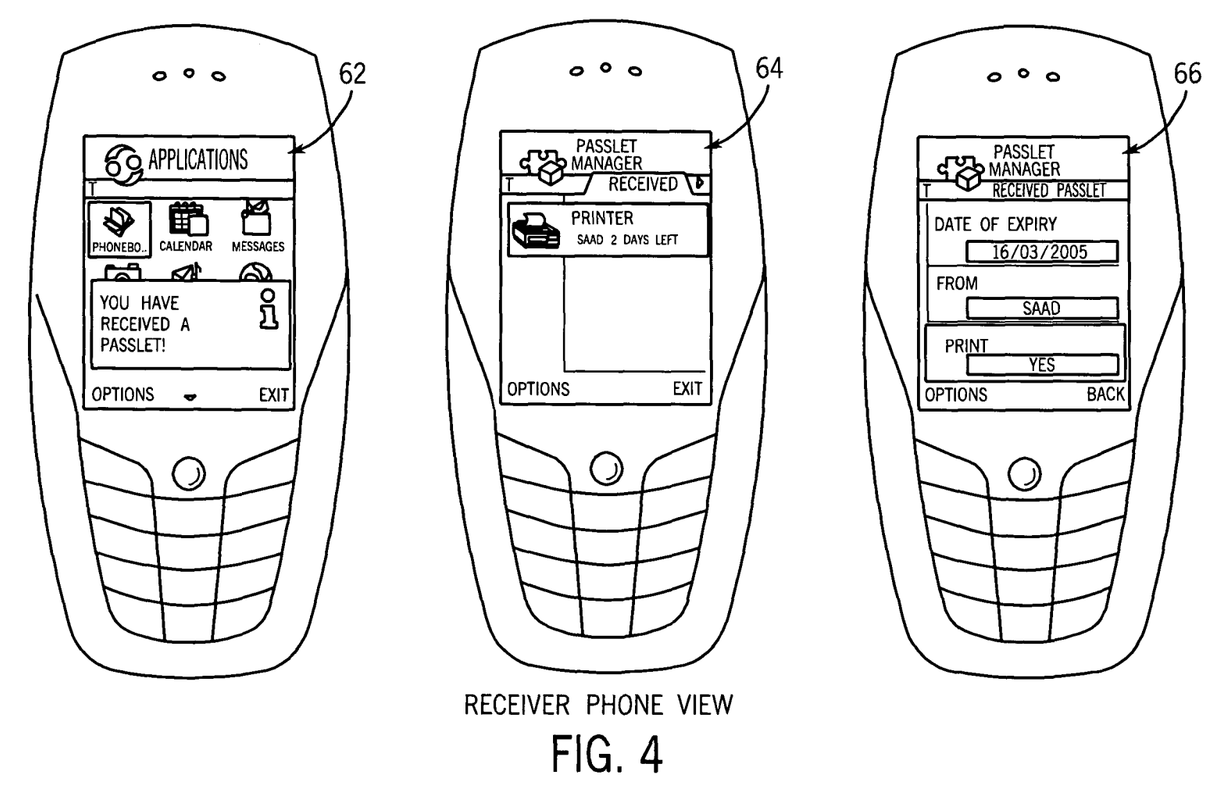
FIG. 4 is an illustration of an example implementation of a user-level tool to receive and view passlets in accordance with an exemplary embodiment.
Figure 5:
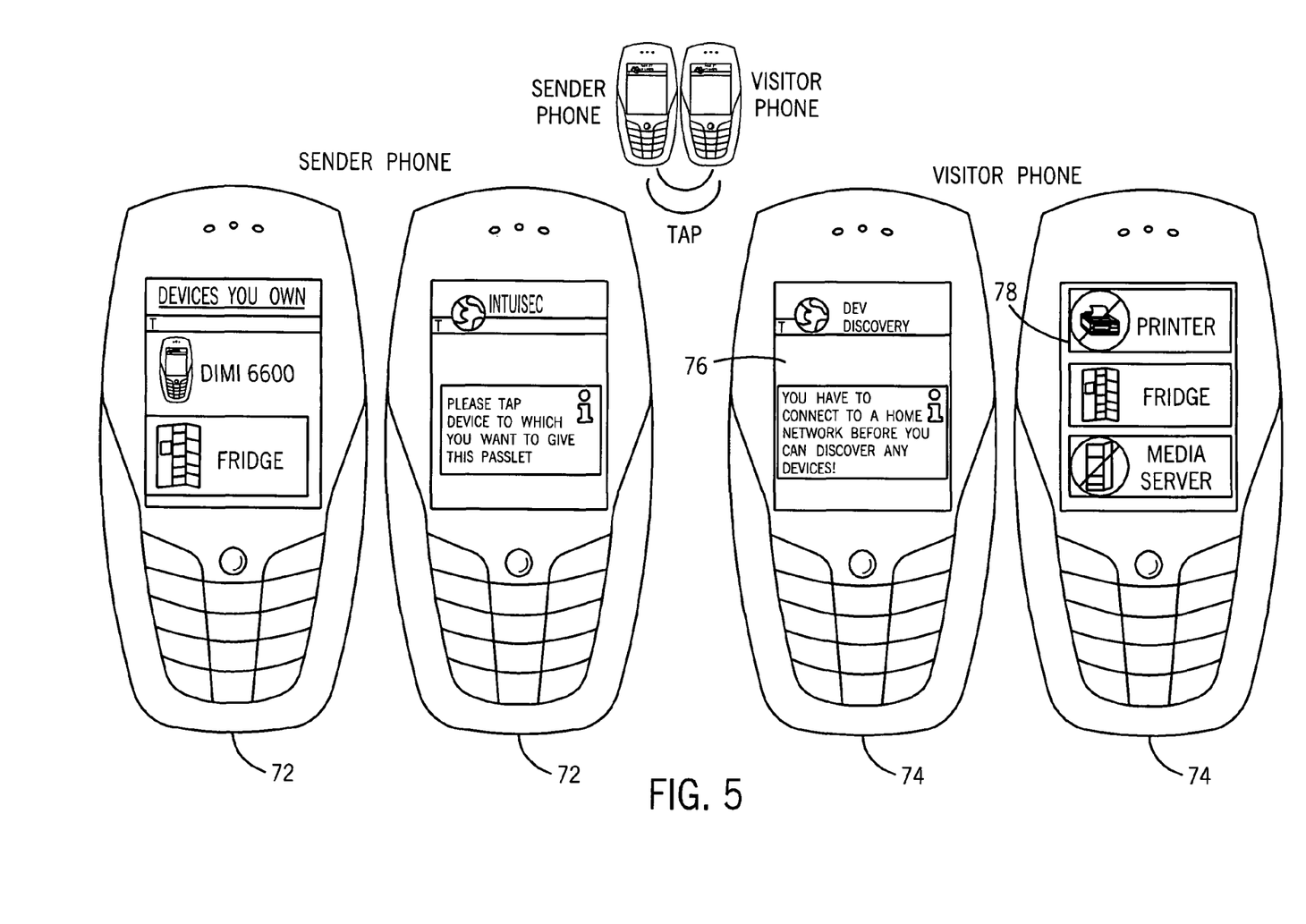
FIG. 5 is an illustration of an example user-interaction for the owner of a "smart-fridge" to grant access to a visitor using passlets in accordance with an exemplary embodiment.

FIGS. 3-5 illustrate an example implementation of a user-level tool for mobile devices. This user-level tool captures the user intent for managing access control using a passlet mechanism. In an interface 52 (FIG. 3), the user of a "sender" phone, or a device capable of creating passlets for certain devices on the network, is presented with a list of devices for which passlets can be created. Passlets can be created for devices that the particular user "owns" or has rights to determine access thereto. After selecting the desired device, a modifiable passlet appears with default settings corresponding to the type of the device that the user has selected. In FIG. 3, an interface 54 is an example of a passlet for a printer and an interface 56 is an example of a passlet for a media-server. The user can modify the default settings according to the level of access that he wishes to grant. After creating the passlet, the user transfers it to the device of the person to whom he wishes to give the passlet. An interface 58 is provided on which the user taps to transfer the passlet over infrared to a recipient device. In alternative embodiments, the transfer is made via another touch enabling technology. Once the recipient receives the passlet, his view of devices on the network changes. The passlet exchange can be done using an out-of-band mechanism, such as a touch, or over the network, depending on how the passlets are designed.

FIG. 4 illustrates an interface 62 on a receiving device having received a passlet. An interface 64 shows the received passlet and properties of the passlet are shown in an interface 66. As shown in FIG. 5, a recipient device 74 of a passlet for a fridge from a sender device 72 can now see that it has access to the fridge. Before receiving the passlet, the recipient device 74 had an interface 76 indicating a block or lack of access to the device. After the recipient device 74 receives the passlet, an interface 78 shows access to the fridge. According to an exemplary embodiment, when the a non-owner device (such as the device that receives a passlet) attempts to print, it first looks to see if it has a passlet for the device it is attempting to access. If no passlet permission exists (in other words, it is the first time attempting to access), a passlet is sent to the target device, which goes through the authentication process. Once authenticated, both the target device and the non-owner or receiving device store an entry in their passlet database showing approval for access. In subsequent attempts at access, this passlet database entry can be used to forgo the authentication process. This entry can expire or be revoked such that the passlet must be again communicated and the authentication process performed.

Figure 6:
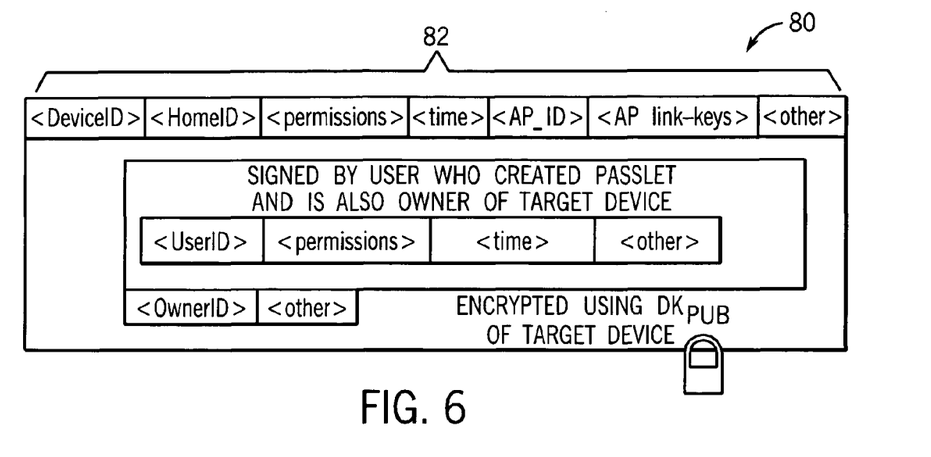
FIG. 6 is an illustration of a design of the content of passlets according to a first embodiment.
Figure 7:
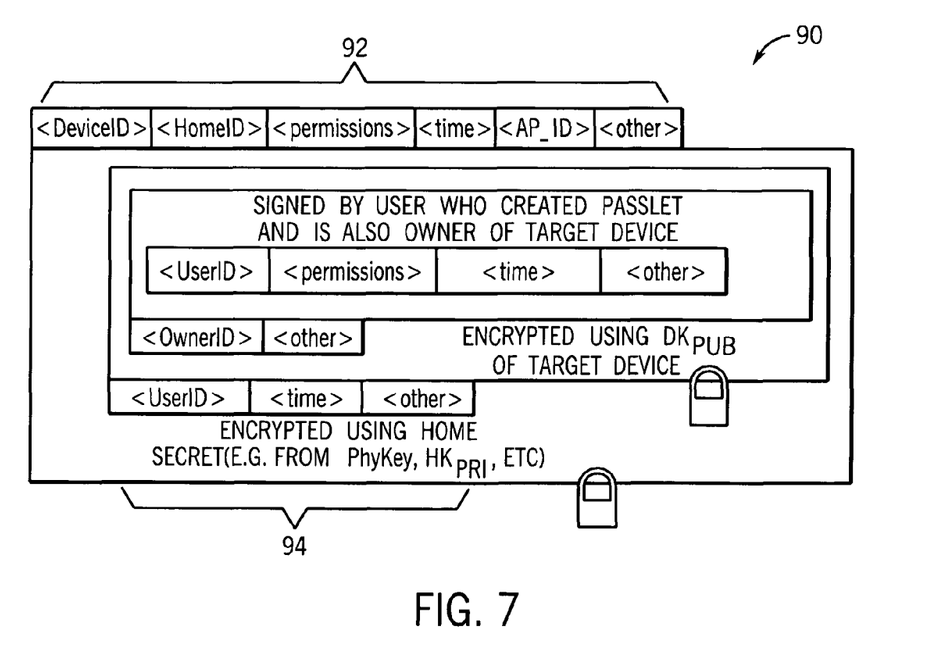
FIG. 7 is an illustration of a design of the content of passlets according to a second embodiment.
Figure 8:
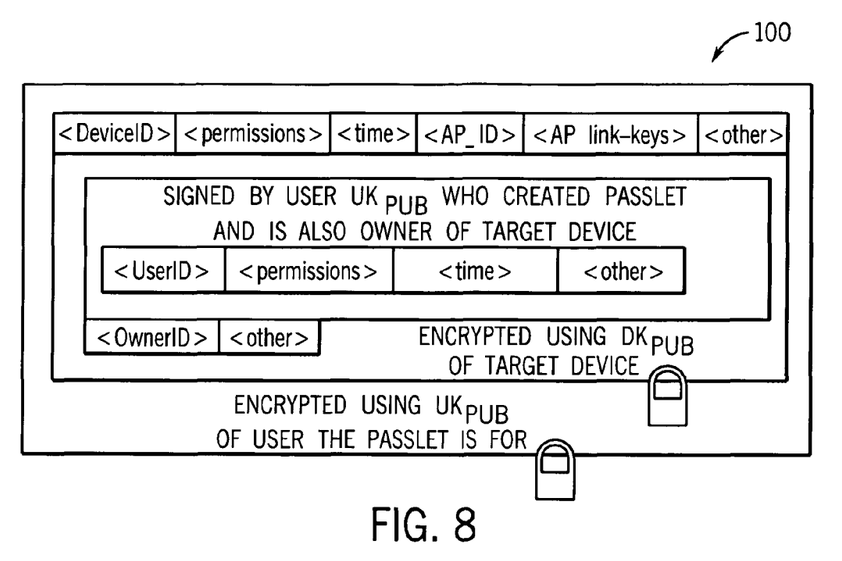
FIG. 8 is an illustration of a design of the content of passlets according to a third embodiment.

FIGS. 6-8 illustrate example designs of the passlets. Three different implementations are shown for illustration purposes, not limitation. The implementations ensure that the contents of the passlet cannot be read except by the device that the passlet is granting access to. This feature can be accomplished by encrypting the passlet with the public key of the device to which access is granted. If a user creates a passlet for his printer, only the printer should be able to read the contents of the passlet. The implementations also ensure authenticity of the passlet. This feature can be accomplished by signing the passlet with the private key of the user who generated the passlet. If a user creates a passlet for his printer, the printer—after decrypting the passlet with its private key—can then verify that the passlet was generated by an authorized user by checking the signature against a list of authorized users.

FIG. 6 illustrates an example passlet design 80 where a device of the user who receives the passlet, also receives the necessary information (e.g. Access Point ID, Access Point link-keys) to gain connectivity to the smart-space network. Information 82 is destined for the passlet recipient device and can be removed when sending the passlet to the target device. The information 82 can include a device ID, permissions, access point ID, expiration, and other information relating to access control.

FIG. 7 illustrates an augmentation to the example passlet design described with reference to FIG. 6. Passlet design 90 of FIG. 7 allows a user to gain network connectivity by sending the passlet to a network access point. The network access point verifies that the passlet was generated by a device that is authorized to do so—in this case a device that knows a certain shared secret called the Home Secret. It then gives the user's device the security parameters required to connect to the network. Information 94 is destined for the access point (AP). The AP decrypts and authenticates the user with user ID. The AP then grants connectivity access to the device for the time duration allowed. Once connected to the AP, the passlet is sent to the target device for further processing.

FIG. 8 illustrates an example passlet design 100 where the entire content of the passlet described with reference to FIG. 6 is also encrypted with the public key of the user who is to receive the passlet. This feature allows the passlet to be decoded only by its intended recipient and, therefore, the passlet can be transmitted via untrusted networks. The passlet design 100 is better for less secure networks because the entire content is encrypted.

FIGS. 9-12 illustrate an example implementation of the passlet middleware on devices that follow the UPnP distributed computing architecture. A control point 110 and a remote device 112 both have resident passlet middleware. The control point 110 includes passlet middleware 114 with a passlet database 116 and a trusted database 118. The passlet middleware 114 also includes a client interface 120 that interfaces with the remote device 112 to establish passlet sessions and to revoke passlets. The passlet middleware 114 is accessed via a control point application 122 and an user interface (UI) applications programming interface (API). The passlet middleware 114 interfaces with universal plug and play (UPnP) middleware 124. The remote device 112 includes passlet middleware 130 which includes a passlet database 132 and a server interface 134. The passlet middleware 130 of the remote device 112 interfaces with UPnP middleware 136. The UPnP middleware 124 of the control point 110 and the UPNP middleware 136 of the remote device 112 can exchange security enhanced UPnP messages, such as SOAP (simple object access protocol) messages. The UPnP middleware 136 includes security components 138, 140, and 144 for a number of devices.

Figure 9:
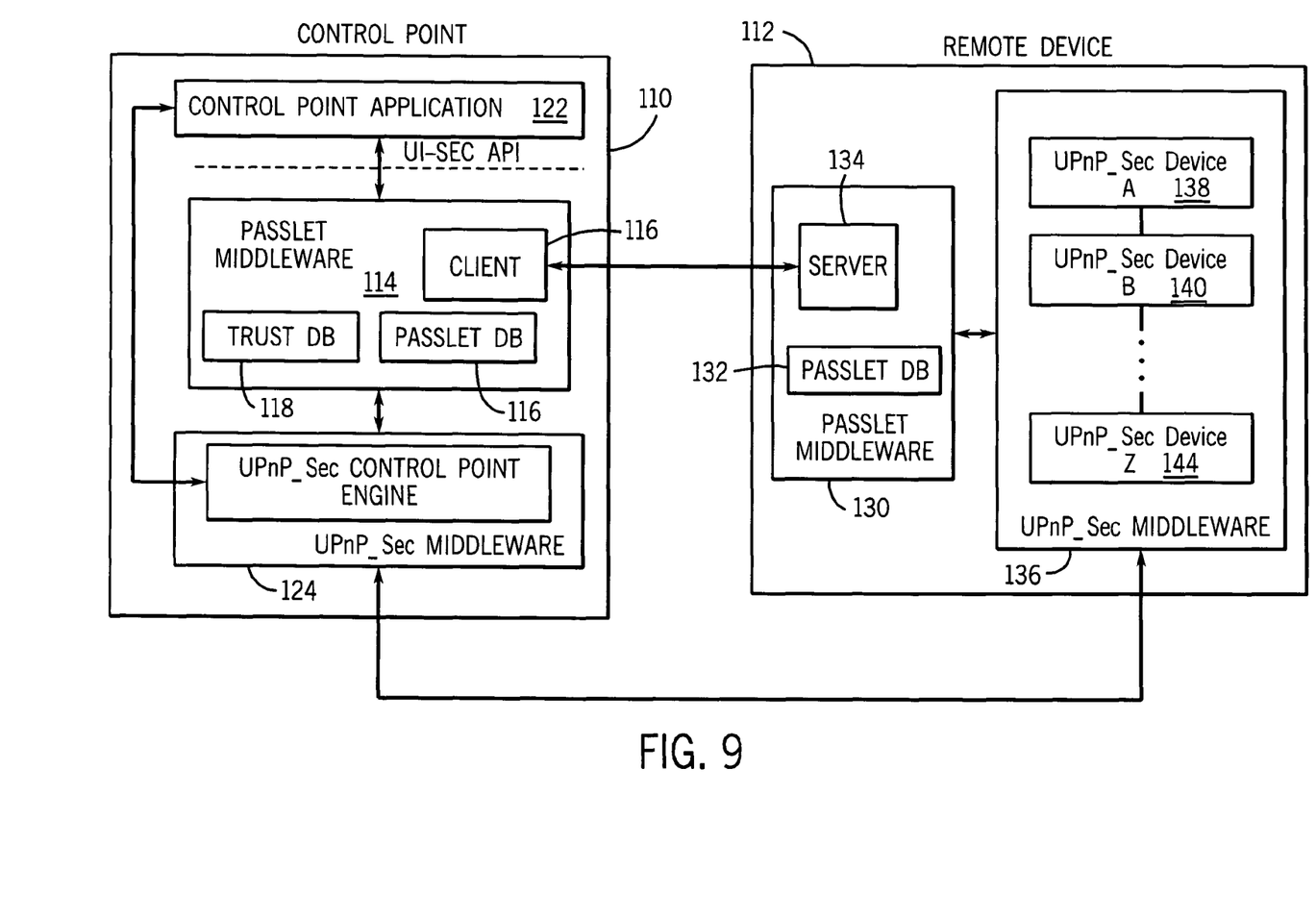
FIG. 9 is an illustration of an implementation of a passlet mechanism for access control on top of a UPNP device architecture in accordance with an exemplary embodiment.

By way of example, a user named Jim has created a passlet for his printer and given it to Bob by "touching" Bob's mobile phone. Bob wants to print a document that he has on his phone and so after browsing the network and discovering the printer, Bob attempts to connect to it. The printer then checks if Bob already has the appropriate privileges to access it and responds with a negative reply. The negative reply results because at this point the printer does not know of the passlet. Bob's phone looks in its passlet repository and sees that it has a passlet for the printer. The passlet is sent to the printer, which decrypts and verifies that the passlet is valid. After doing so, a passlet 'session' is established whereby the printer generates a shared session key that it uses in all further communication with Bob for the duration of the validity of the passlet. All SOAP (simple object access protocol) actions that Bob then sends to the printer are checked against the level of access specified in the passlet.

Figure 10:
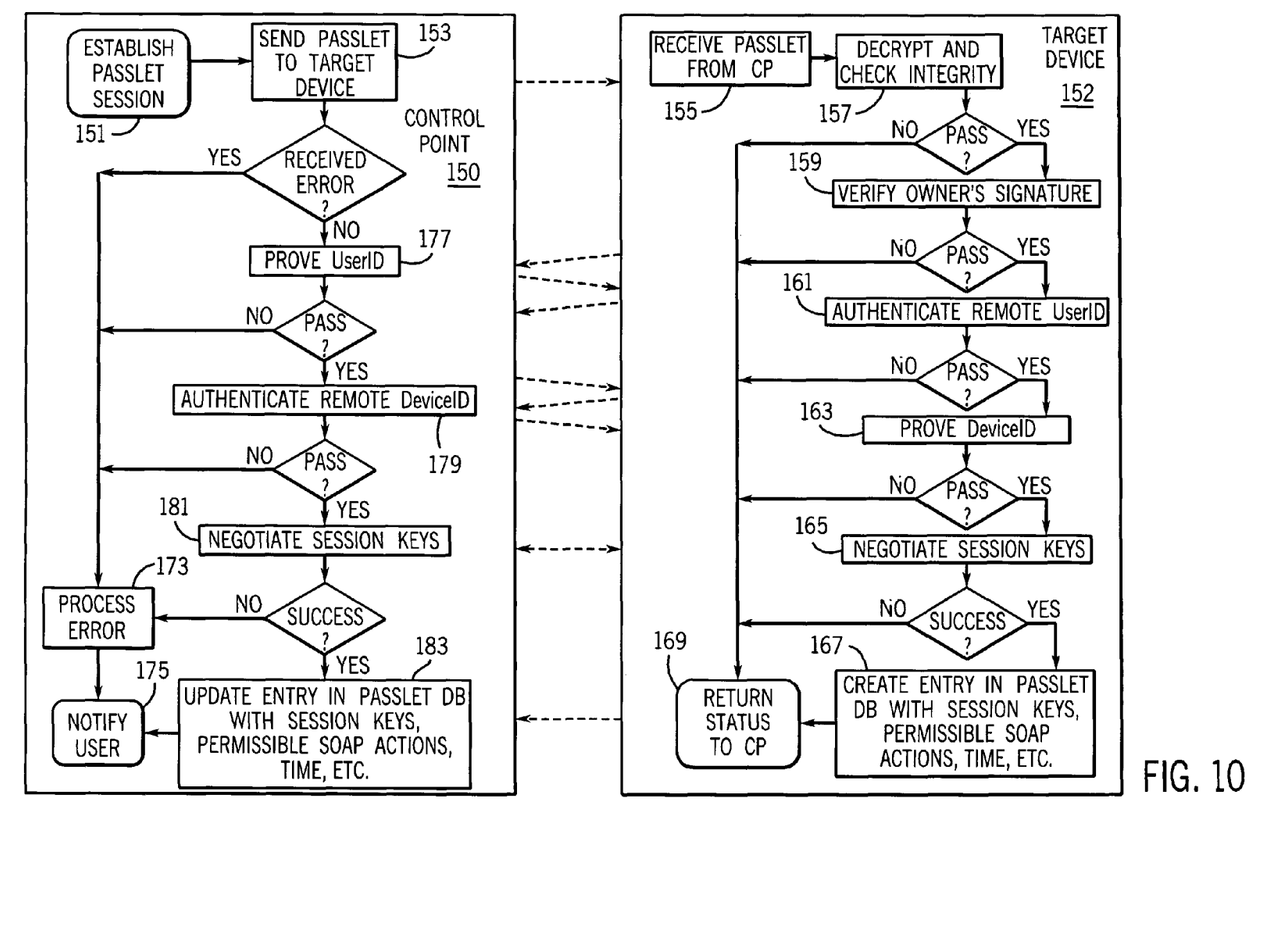
FIG. 10 is an illustration of an implementation of passlet session establishment logic in accordance with an exemplary embodiment.
Figure 11:
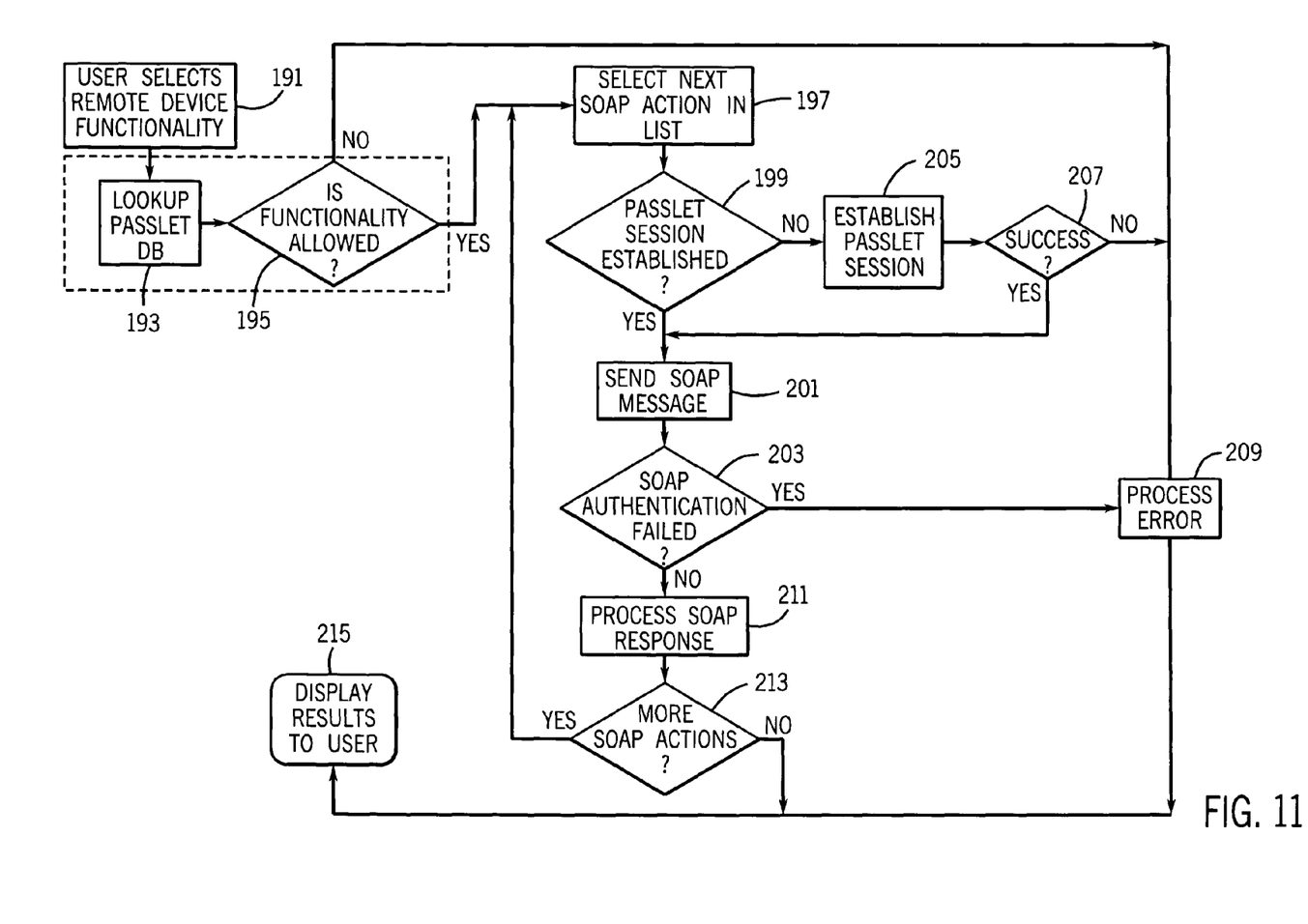
FIG. 11 is an illustration of an implementation of control point logic in order to access a remote UPnP device in accordance with an exemplary embodiment.
Figure 12:
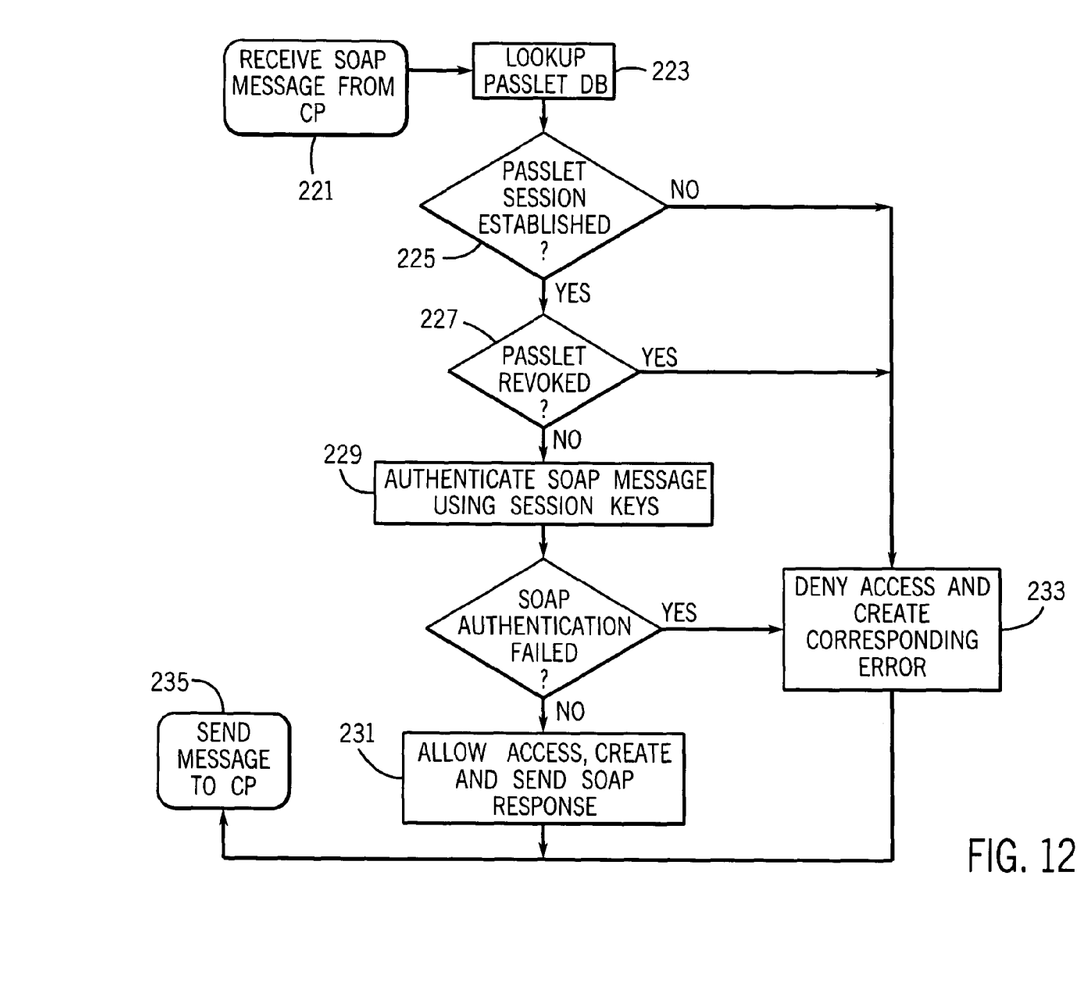
FIG. 12 is an illustration of an implementation of remote device logic in order to decide whether to grant access or not for a requested action in accordance with an exemplary embodiment.

FIGS. 10-12 show passlet communication procedures in greater detail. FIG. 10 illustrates operations performed in an example implementation of passlet session establishment logic. Additional, fewer, or different operations may be performed depending on the embodiment. In an operation 151, a control point 150 seeks to establish a passlet session with a target device 152. A passlet is sent to the target device 152 in an operation 153. In an operation 155, the target device 152 receives the passlet from the control point 150. The target device 152 decrypts and checks the integrity of the passlet in an operation 157. In a series of operations (operations 159-167) the target device 152 verifies the passlet owner's signature, authenticates the remote user ID, proves the target device ID, negotiates session keys, and creates an entry in the passlet database with cession keys, permissible actions, time, etc. If any of operations 159-167 fail or provide an error, such status is returned to the control point 150 in an operation 169.

At the control point 150, in an operation 171, if an error is received, it is processed in an operation 173 and the user is notified in an operation 175. If no error is received, a series of operations (operations 177-183) are performed in which the control point 150 proves its user ID, authenticates the remote device ID, negotiates session keys, and updates entries in the passlet database with session keys, permissible actions, time, etc. If any of operations 177-183 fail or provide an error, the error is processed in operation 173 and the user is notified in operation 175.

FIG. 11 illustrates operations performed in an example implementation of control logic to access a remote UPnP device. Additional, fewer, or different operations may be performed depending on the embodiment. In an operation 191, a user selects a remote device functionality. In a preferred embodiment, a lookup is performed in the passlet database (operation 193) to determine if a functionality is permitted (operation 195). Such a feature is optional but advantageously avoids sending messages that are later rejected for security reasons.

In an operation 197, a next action is selected. A determination is made in operation 199 whether a passlet session is established. If the passlet session has not been established, a passlet session is established as described with reference to FIG. 10. If the passlet session is established, an operation 201 is performed in which a message, such as a SOAP message, is sent. If authentication fails (operation 203) or if the passlet session fails to be established (operations 205 and 207), the error is processed in operation 209. If authentication is successful, the authentication message response is processed (operation 211) and a determination is made whether more actions are needed (operation 213). Results are displayed to the user in an operation 215.

FIG. 12 illustrates operations performed in an example implementation of remote device logic to decide whether to grant access or not for a requested action. Additional, fewer, or different operations may be performed depending on the embodiment. In an operation 221, a message is received from the control point. A lookup of the passlet database is performed in an operation 223 and a determination is made in an operation 225 whether a passlet session has been established. A determination is made whether the passlet has been revoked (operation 227). Messages are authenticated using session keys in an operation 229. If authentication does not fail, access is permitted and a response is created and sent (operation 231). If a passlet session has not been established, if the passlet is revoked, or if authentication fails, access is denied and a corresponding error is created (operation 233). Whatever the result, it is communicated to the control point in an operation 235.

The exemplary embodiments described with reference to FIGS. 1-12 provide many advantages. One feature of the exemplary embodiments is the provision for revocation of granted access. A user can view passlets that he has generated and upon selecting a given passlet, he may choose to revoke it. By way of example, if Jim decides to revoke the passlet he has given to Bob, his phone will send a message to the printer informing it that the passlet has been revoked. The printer appropriately modifies its underlying access control structures and if Bob tries to connect to the printer again, he is notified that he does not have access.

The exemplary embodiments permit everyday users to interact with a multitude of networked devices easily and securely. Current security frameworks are too demanding on users both in terms of expertise and time. As described, it is possible to hide low-level security details from the user. The user needs to know nothing about access control lists, encryption, private/public keys, etc. Passlets abstract underlying security parameters and present users with a tangible entity that they can simply hand out to other people. Moreover, passlets are flexible in terms of their content, which allows implementers to use them in a variety of scenarios and with a variety of underlying security mechanisms.

While several embodiments of the invention have been described, it is to be understood that modifications and changes will occur to those skilled in the art to which the invention pertains. Accordingly, the claims appended to this specification are intended to define the invention more precisely.

The invention claimed is:

1. A method comprising:
receiving, at a first user device and from a second user device, a passlet that allows a first user access to a target device and that includes:
information identifying the target device,
information identifying at least one service providable to the first user device by the target device, and
information identifying a second user, which is different from the first user, that created the passlet and has access-determination rights to the target device which allow the second user to grant the first user access to the target device;
decrypting the passlet using a key of the first user, resulting in a decrypted portion of the passlet and an encrypted portion of the passlet that is encrypted using a key of the target device;
providing at least the encrypted portion of the passlet to an interface to cause communication of at least the encrypted portion of the passlet to the target device via a network;
receiving, after providing at least the encrypted portion of the passlet, a response from the target device indicating the first user device is permitted to access the target device for the at least one service.

2. The method of claim 1, wherein the passlet is configured to be transferable to one or more other user devices associated with the first user and allow the first user access to the target device using the one or more other user devices.

3. The method of claim 2, further comprising receiving a selection at the first user device for functionality of the target device, wherein the functionality corresponds to the passlet, which is one of a plurality of passlets stored by the first user device for the target device.

4. The method of claim 2, wherein the passlet comprises permission information and expiration data.

5. The method of claim 2, further comprising updating a database of the first user device with session keys, permissible actions, and a timestamp indicating successful negotiation of the passlet between the first user device and the target device.

6. The method of claim 2, further comprising communicating at least the encrypted portion of the passlet from the first user device to a network access point; and
receiving, at the first user device and from the network access point, information indicating that that the passlet has been verified to have been created by the second user.

7. The method of claim 1, wherein the key of the target device includes a public key of the target device.

8. The method of claim 1, wherein the providing of at least the encrypted portion of the passlet is initiated by the first user via a user-level tool that comprises a graphical user interface, wherein the graphical user interface includes a display of devices on the network that the first user device is permitted to access, and wherein the devices on the network that the first device is permitted to access is determined by the user-level tool based on one or more passlets received at the first user device.

9. The method of claim 1 wherein the method further comprises:
causing transmission of the passlet to a third user device to enable the first user to access the target device via the third user device based on the passlet.

10. The method of claim 9, wherein the passlet is received from the second user device out-of-band relative to the network.

11. The method of claim 9, wherein the passlet is received via the network and the providing of at least the encrypted portion of the passlet is initiated by the first user.

12. The method of claim 1, further comprising receiving a revocation message from the second user device that revokes permission rights in the passlet.

13. The method of claim 1, further comprising generating the passlet at the second user device, and wherein each of the second user device and the first user device is a mobile phone.

14. The method of claim 13, wherein the target device comprises a printer and the network is a local network providing network connectivity to at least the first user device, the second user device and the printer.

15. A device, comprising:
a database storing a passlet that allows a first user access to a target device and that includes
information identifying the target device,
information identifying at least one service providable to the device by the target device, and
information identifying a second user, which is different from the first user, that created the passlet and has access-determination rights to the target device which allow the second user to grant the first user access to the target device;
a communication interface configured to transmit via a network to at least the target device; and
programmed instructions configured to, when executed, cause the device to
receive the passlet from a user device associated with the second user;
decrypt the passlet using a first key, resulting in a decrypted portion of the passlet and an encrypted portion of the passlet that is encrypted using a second key, and
after decrypting the passlet using the first key, provide at least the encrypted portion to the communication interface for transmission to the target device to cause the device to be permitted access to the target device for the at least one service.

16. The device of claim 15, wherein the programmed instructions are configured to, when executed, cause the device to:
receive a response permitting the device to access the target device; and
after receiving the response, provide one or more actions associated with the at least one service to the communication interface for transmission to the target device.

17. The device of claim 16, wherein the decrypted portion includes a device name and expiration information for the passlet.

18. The device of claim 16, wherein the programmed instructions are configured to, when executed, cause the device to provide a user interface that displays device names of a plurality of networked devices and an indication of whether access permissions are available for each of the plurality of networked devices, wherein the indication of whether access permissions are available for each of the plurality of networked devices is determined based on whether one passlet for the networked device is stored in the database.

19. The device of claim 16, wherein the passlet further includes permission information and expiration data.

20. The device of claim 16, wherein the database stores one or more session keys, one or more permissible actions, and a timestamp indicating successful negotiation of the passlet with the target device.

21. The device of claim 16, wherein the device is a mobile phone.

22. A system comprising:
a first user device that comprises (a) a database storing a passlet that defines access permissions to a target device, (b) an interface configured to communicate with at least an access device via a network, and (c) programmed instructions configured to, when executed, cause the first user device to
receive the passlet from a second user device,
decrypt the passlet using a first key, resulting in a decrypted portion of the passlet and an encrypted portion of the passlet that is encrypted using a second key, and
provide at least the encrypted portion of the passlet to the interface for communication to the access device via the network,
wherein the passlet includes
information identifying the target device,
information identifying at least one service providable to the first user device by the target device, and
information identifying a second user, which is different from the first user, that created the passlet and has access-determination rights to the target device which allow the second user to grant the first user access to the target device; and
the access device connected to the network and configured to
verify access permission based on at least the encrypted portion of the passlet received by the access device from the interface via the network, and
provide, based on the verifying of the access permission, a response to the first user device indicating the first user device is permitted to access the target device for the at least one service.

23. The system of claim 22, wherein the passlet comprises permission information and expiration data.

24. The system of claim 22, wherein the database includes session keys, permissible actions, and a timestamp indicating successful negotiation of the passlet.

25. The system of claim 22, wherein the second key comprises a key of the access device, and wherein the access device is configured to decrypt the encrypted portion of the passlet using the key of the access device.

26. The system of claim 22, wherein the first user device is a mobile phone.

27. The system of claim 26, wherein the target device comprises a printer and the network is a local network providing network connectivity to at least the first user device and the printer.

28. The system of claim 26, further comprising the second user device, wherein the second user device is configured to generate the passlet and send the passlet to the first user device, wherein the second user device is a mobile phone.

* * * * *

UNITED STATES PATENT AND TRADEMARK OFFICE
CERTIFICATE OF CORRECTION

| | |
|---|---|
| PATENT NO. | : 9,032,215 B2 |
| APPLICATION NO. | : 11/153307 |
| DATED | : May 12, 2015 |
| INVENTOR(S) | : Dimitris Kalofonos et al. |

It is certified that error appears in the above-identified patent and that said Letters Patent is hereby corrected as shown below:

Title Page

On Page 2, Column 2, OTHER PUBLICATIONS, Line 6
    Please delete "RU200714785109" and insert --RU200714785/09--.

Claims

In Column 9, Claim 6, Line 59
    Please delete "indicating that that the" and insert --indicating that the--.

Signed and Sealed this
Tenth Day of November, 2015

Michelle K. Lee
*Director of the United States Patent and Trademark Office*